US012728696B2

(12) United States Patent
Cheng et al.

(10) Patent No.: US 12,728,696 B2
(45) Date of Patent: Sep. 8, 2026

(54) FLUID MANAGEMENT APPARATUS AND THERMAL MANAGEMENT SYSTEM

(71) Applicant: ZHEJIANG SANHUA AUTOMOTIVE COMPONENTS CO., LTD., Hangzhou (CN)

(72) Inventors: Haonan Cheng, Hangzhou (CN); Xiangyu Zhang, Hangzhou (CN); Chunqiang Wu, Hangzhou (CN); Yongxiang Tan, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 274 days.

(21) Appl. No.: 18/554,812

(22) PCT Filed: Apr. 12, 2022

(86) PCT No.: PCT/CN2022/086234
§ 371 (c)(1),
(2) Date: Oct. 11, 2023

(87) PCT Pub. No.: WO2022/218279
PCT Pub. Date: Oct. 20, 2022

(65) Prior Publication Data

US 2024/0198756 A1 Jun. 20, 2024

(30) Foreign Application Priority Data

Apr. 12, 2021 (CN) ......................... 202110386477.8

(51) Int. Cl.
*B60H 1/00* (2006.01)
*F28D 9/00* (2006.01)
*F28D 21/00* (2006.01)

(52) U.S. Cl.
CPC ..... *B60H 1/00485* (2013.01); *B60H 1/00342* (2013.01); *B60H 1/00385* (2013.01);
(Continued)

(58) Field of Classification Search
CPC ............ B60H 1/00485; B60H 1/00342; B60H 1/00385; B60H 1/00507; B60H 1/00792;
(Continued)

(56) References Cited

U.S. PATENT DOCUMENTS

2015/0276328 A1 10/2015 Huang et al.
2021/0086588 A1* 3/2021 Kawada .................. B60H 1/32
(Continued)

FOREIGN PATENT DOCUMENTS

CN 108266568 A 7/2018
CN 110459832 A 11/2019
(Continued)

OTHER PUBLICATIONS

International Search Report for PCT/CN2022/086234 mailed Jun. 8, 2022, ISA/CN.
(Continued)

*Primary Examiner* — Marc E Norman
(74) *Attorney, Agent, or Firm* — Yue (Robert) Xu; Apex Attorneys at Law, LLP

(57) ABSTRACT

A fluid management apparatus and a thermal management system are provided. The fluid management apparatus includes a connector and a fluid control portion. The connector has a first accommodating cavity which accommodates the fluid control portion, an opening of the first accommodating cavity is located on a first side portion, at least part of the wall of the first side portion is perpendicular to a first surface, and projections of sub-channels located on the connector on the first surface do not overlap.

16 Claims, 6 Drawing Sheets

(52) U.S. Cl.
CPC ..... *B60H 1/00507* (2013.01); *B60H 1/00792* (2013.01); *F28D 9/005* (2013.01); *F28D 2021/008* (2013.01); *F28F 2250/06* (2013.01)

(58) Field of Classification Search
CPC . F28D 9/005; F28D 2021/008; F28F 2250/06
See application file for complete search history.

(56) References Cited

U.S. PATENT DOCUMENTS

| | | | | |
|---|---|---|---|---|
| 2022/0003466 | A1 | 1/2022 | Huang et al. | |
| 2022/0069379 | A1 | 3/2022 | Zang et al. | |
| 2024/0017587 | A1* | 1/2024 | Jin | F25B 25/005 |
| 2024/0017593 | A1* | 1/2024 | Li | B60K 11/02 |
| 2024/0157759 | A1* | 5/2024 | Jiang | F25B 41/20 |
| 2024/0175608 | A1* | 5/2024 | Jiang | F25B 1/00 |
| 2024/0198756 | A1 | 6/2024 | Cheng et al. | |

FOREIGN PATENT DOCUMENTS

| | | | |
|---|---|---|---|
| CN | 111255933 | A | 6/2020 |
| CN | 111503293 | A | 8/2020 |
| CN | 112026474 | A | 12/2020 |
| CN | 112428772 | A | 3/2021 |
| CN | 112428773 | A | 3/2021 |
| CN | 212750972 | U | 3/2021 |
| CN | 115195390 | A | 10/2022 |
| CN | 115195391 | A | 10/2022 |
| DE | 102017221675 | A1 | 6/2019 |
| EP | 2329972 | A1 | 6/2011 |
| EP | 4184085 | A1 | 5/2023 |
| JP | 2018184075 | A | 11/2018 |

OTHER PUBLICATIONS

The European search report issued on Mar. 25, 2025 for EP22787505. 1.

The Chinese 1st Office Action issued on Dec. 26, 2024 for CN202110386477.8.

* cited by examiner

FLUID MANAGEMENT APPARATUS AND THERMAL MANAGEMENT SYSTEM

This application is the national phase of International Application No. PCT/CN2022/086234, titled "FLUID MANAGEMENT APPARATUS AND THERMAL MANAGEMENT SYSTEM", filed on Apr. 12, 2022, which claims the priority to Chinese Patent Application No. 202110386477.8, titled "FLUID MANAGEMENT APPARATUS AND THERMAL MANAGEMENT SYSTEM", filed with the China National Intellectual Property Administration on Apr. 12, 2021, the entire disclosures thereof are incorporated herein by reference.

FIELD

This application relates to the technical field of fluid management, and in particular to a fluid management apparatus and a thermal management system.

BACKGROUND

Athermal management system includes components such as a fluid control component, a sensor and the like, and the components are usually connected by means of multiple pipelines. When the system becomes more complex, the number of components increases and the number of connection points, leading to an increased risk of leakage of the thermal management system at the connection points, and a relatively large space is occupied.

SUMMARY

An object of this application is to provide a fluid management apparatus and a thermal management system, to make the fluid management apparatus and the thermal management system compact and to help reduce the leakage at the connections as well.

One embodiment of the present application adopts the following technical solution.

A fluid management apparatus includes a connector and a fluid control portion, where the connector includes a first accommodating portion having a first accommodating cavity, at least part of the fluid control portion is located in the first accommodating cavity, and the fluid control portion is fixedly or limitedly connected to the connector;

- the connector has a communication channel, and the communication channel has an opening in a wall of the first accommodating portion; and
- the connector includes a first side portion, the first accommodating cavity has an opening on the first side portion; a first plane is defined, and at least part of a wall of the first side portion is perpendicular to the first plane; the communication channel includes a plurality of sub-channels, and projections of the sub-channels on the first plane are not overlapped.

Another embodiment of the application adopts the following technical solution. A thermal management system includes a compressor, a throttling element, a fourth heat exchanger and the above fluid management apparatus. The fluid management apparatus includes a first port, a second port, a third port and a fourth port; an outlet of the compressor is in communication with the third port, the fourth port is in communication with the second port through the throttling unit and the fourth heat exchanger, and the first port is in communication with an inlet of the compressor.

The fluid management apparatus and thermal management system according to the application include a connector and a fluid control portion, where the connector has a first accommodating cavity for accommodating the fluid control portion, an opening of the first accommodating cavity is located on a first side portion, at least part of a wall of the first side portion is perpendicular to a first plane, and the projections of the sub-channels located at the connector on the first plane are not overlapped. With this arrangement, the volume of the fluid management apparatus is relatively small, and the sub-channels are located in the connector, which is also beneficial to preventing leakage.

DETAILED DESCRIPTION OF THE EMBODIMENTS

Figure 1:
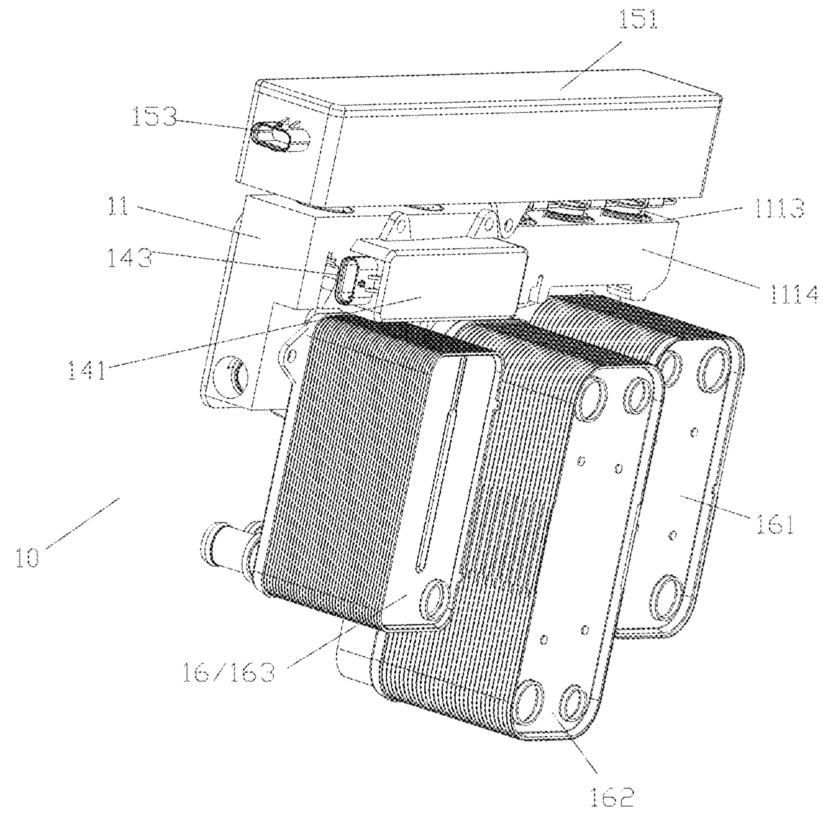
FIG. 1 is a schematic view of a three-dimensional structure of a fluid management apparatus according to a first embodiment of the present application from one perspective.

The fluid management apparatus according to the present application can be applied to a vehicle thermal management system, where the vehicle includes a new energy vehicle, and the fluid is a refrigerant, including R134a or CO2 or other forms of refrigerant. The application will be further explained below in conjunction with the accompanying drawings and specific embodiments.

Please refer to FIG. 1 to FIG. 9, a fluid management apparatus 10 is provided according to one embodiment of the present application, the fluid management apparatus includes a connector 11, a fluid control portion 12 and a sensing portion 13. The connector 11 includes a first accommodating portion 1111 and a second accommodating portion 1112. The first accommodating portion 1111 has a first accommodating cavity 1111', and at least part of the fluid control portion 12 is located in the first accommodating cavity 1111'. The fluid control portion 12 is fixedly or limitedly connected to the connector 11. The second accommodating portion 1112 has a second accommodating cavity 1112', and at least part of the sensing portion 13 is located in the second accommodating cavity 1112'. The sensing portion 13 is fixedly or limitedly connected to the connector 11. The connector 11 has a communication channel 1100, and the communication channel 1100 has an opening 1110 in a wall of the first accommodating portion 1111. A sensing element of the sensing portion 13 is configured to sense a temperature and/or pressure or other parameters of a fluid in the communication channel 1100. In one embodiment, the sensing element of the sensing portion 13 is located in the communication channel 1100. In addition, the fluid management apparatus 10 may also have a communication cavity, and the communication cavity is in communication with the communication channel 1100. The sensing element of the sensing portion 13 is located in the communication cavity, and the communication cavity may be located in the connector 11 or in the sensing portion 13, which will not be described in detail. The connector 11 includes a first side portion 1113 and a second side portion 1114. The first accommodating cavity 1111' has an opening on the first side portion 1113, and the second accommodating cavity 1112' has an opening in the wall of the second side portion 1114. A first plane 1001 is defined, the first plane 1001 is perpendicular to an axis of the second accommodating portion 1112, and at least part of a wall of the first side portion 1113 is perpendicular to the first plane 1001. The communication channel 1100 includes a plurality of sub-channels, in the axial direction of the second accommodating portion 1112, projections of the sub-channels on the first plane 1001 are not overlapped, in other words, the sub-channels do not intersect with each other, in this way, the connector 11 is relatively compressed in the direction perpendicular to the axis of the second accommodating portion 1112, which facilitates the design and processing. In this embodiment, the connection manner includes welding, bonding, bolt connection or the like. Herein, "perpendicular" as described herein includes cases that an included angle ranges from 80° to 100°, and "parallel" as described herein includes cases that the included angle ranges from −10° to 10°. The connector 11 has the first accommodating cavity 1111' for accommodating the fluid control portion 12, and the connector 11 has the second accommodating cavity 1112' for accommodating the sensing portion 13, the opening of the first accommodating cavity 1111' is located on the first side portion 1113, the opening of the second accommodating cavity 1112' is located on the second side portion 1114, at least part of the wall of the first side portion 1113 is perpendicular to the first plane 1001, and the projections of the sub-channels located in the connector 11 on the first plane 1001 do not overlap, so that the volume of the fluid management apparatus 10 is relatively small, and the sub-channels are located within the connector 11, which is also beneficial for preventing leakage.

Please refer to FIG. 4 to FIG. 8, the connector 11 includes at least two plate bodies that are arranged in a stacked manner, and adjacent plate bodies are fixed and hermetically connected to each other. At least one communication channel portion 110 is provided inside at least one of the adjacent plate bodies, and the communication channel 1100 is formed at the communication channel portion 110 in the adjacent plate bodies. In this embodiment, the connector 11 includes a first plate body 111 and a second plate body 112, the first plate body 111 and the second plate body 112 are the two outermost plate bodies of the connector 11, wherein the first side portion 1113 and the second side portion 1114 are located in the first plate body 111. It can be known that the fluid control portion 12 and the sensing portion 13 are fixedly or limitedly connected to the first plate body 111.

The number of the sensing portion 13 is two or more, and the connector 11 has the second accommodating cavities 1112' in one-to-one correspondence with the sensing portions 13. In this embodiment, the number of the sensing portions 13 is four, i.e., the sensing portions 13 includes a first sensing portion 131, a second sensing portion 132, a third sensing portion 133 and a fourth sensing portion 134. The fluid management apparatus 10 includes a first housing 141, a first circuit board 142 and a first plug 143. The first housing 141 is fixedly or limitedly connected to the connector 11. The first circuit board 142 is located within the first housing 141, and the first circuit board 142 is fixedly or limitedly connected to the first housing 141 or the connector 11. The first circuit board 142 has a surface facing the second side portion 1114. Each of the sensing portions 13 is electrically and/or signally connected to the first circuit board 142. A shell of the first plug 143 is fixedly or limitedly connected to the first housing 141 or is of a one-piece structure with the first housing 141. A pin of the first plug 143 is electrically and/or signally connected to the first circuit board 142. Signals from the multiple sensing portions 13 can be collected via the circuit board and then transmitted to a host computer or a controller via the first plug 143, in this way, the number of the plugs can be reduced, and the installation of the fluid management apparatus 10 is more convenient. In other embodiments, the first circuit board 142 may have one part located in the first housing 141, and the other part located in a recess formed by the connector 11, which will not be described in detail.

Figure 3:
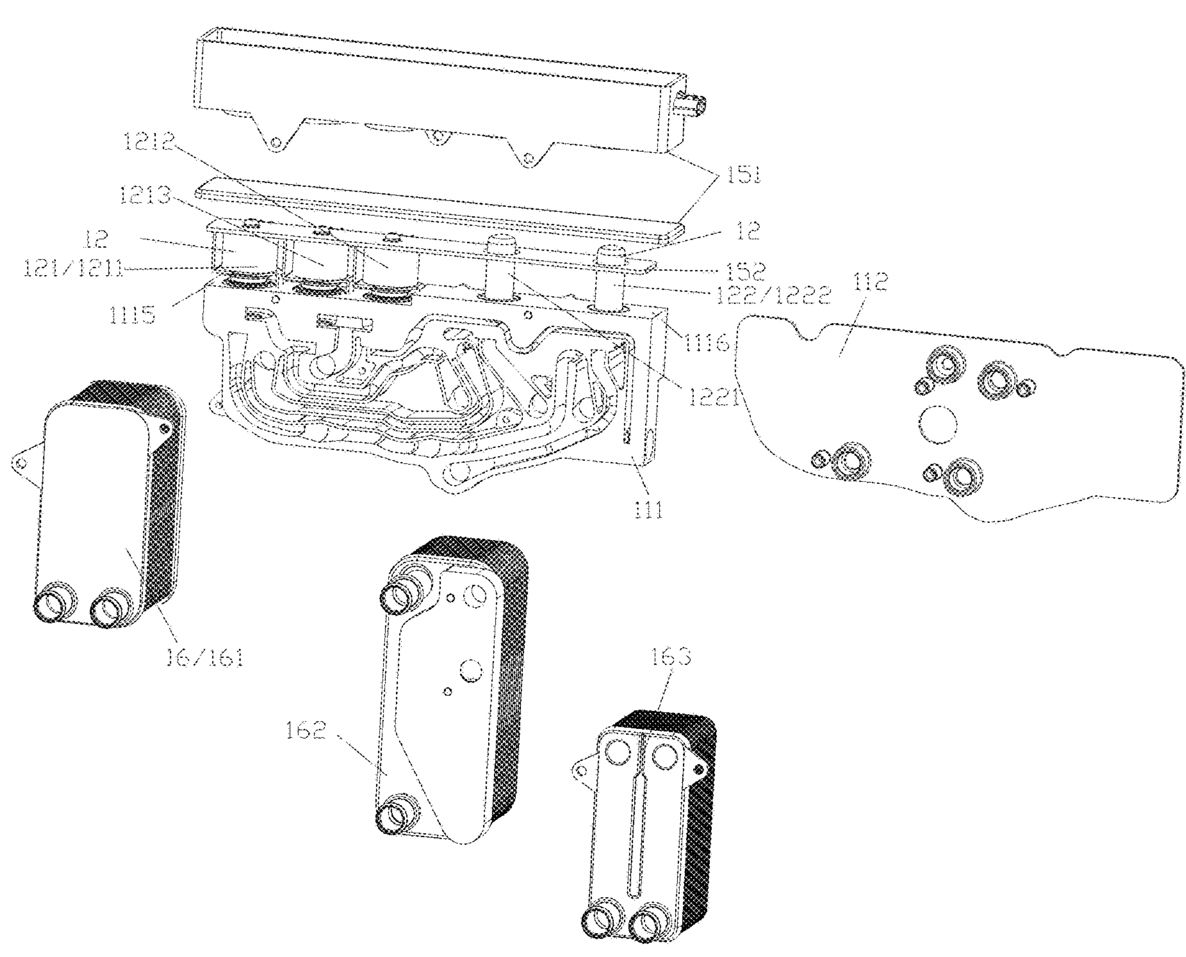
FIG. 3 is a schematic view of an exploded structure of the fluid management apparatus in FIG. 1 from one perspective.

Please refer to FIG. 3, the number of the fluid control portions 12 is two or more, the connector 11 has the first accommodating cavities 1111' which are in one-to-one correspondence with the fluid control portions 12. The fluid management apparatus 10 includes a second housing 151, a second circuit board 152 and a second plug 153. The second housing 151 is fixedly or limitedly connected to the connector 11. At least part of the second circuit board 152 is located within the second housing 151, and the second circuit board 152 has a surface facing the first side portion 1113. Each of the fluid control portions 12 is electrically and/or signally connected to the second circuit board 152. A shell of the second plug 153 is fixedly or limitedly connected to the second housing 151 or is of a one-piece structure with the second housing 151. A pin of the second plug 153 is electrically and/or signally connected to the second circuit board 152. The multiple fluid control portions 12 are electrically and/or signally connected to the second circuit board 152, and the circuit board is electrically and/or signally connected to the pin of the second plug 153. The second plug 153 is configured to be electrically and/or signally connected to the host computer or the controller, in this way, the number of the second plugs 153 can be reduced, the number of the circuit boards can be reduced, and the installation of the fluid management apparatus 10 is more convenient.

Figure 5:
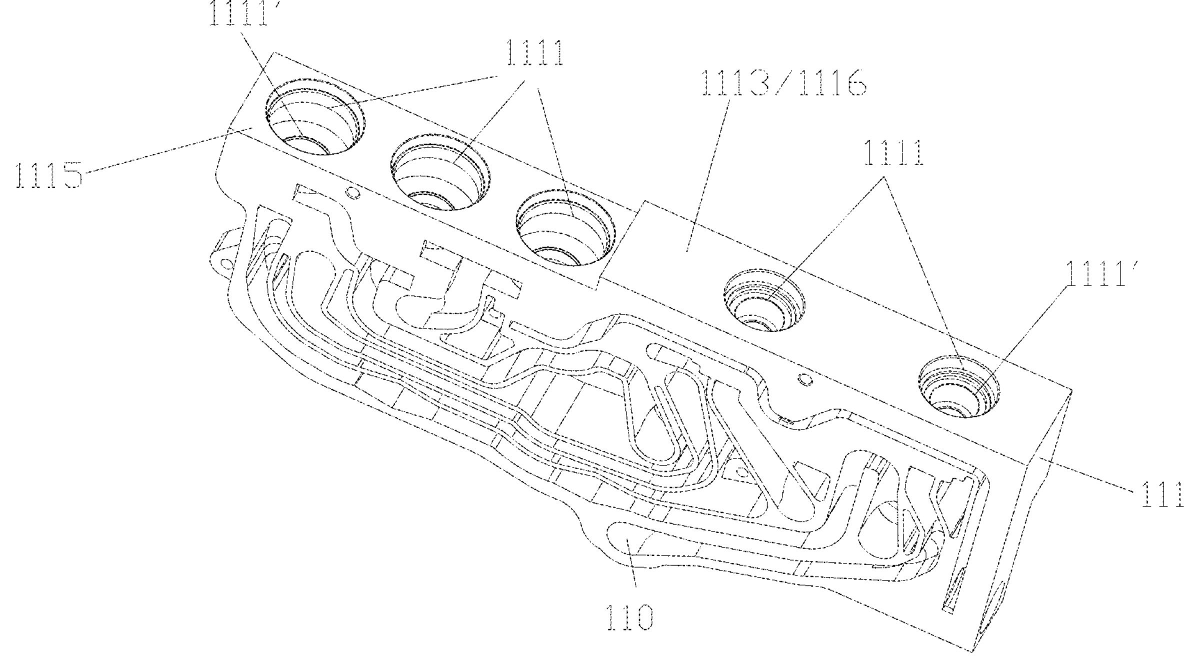
FIG. 5 is a schematic view of a three-dimensional structure of a first plate body of a connector in FIG. 1 from one perspective.
Figure 6:
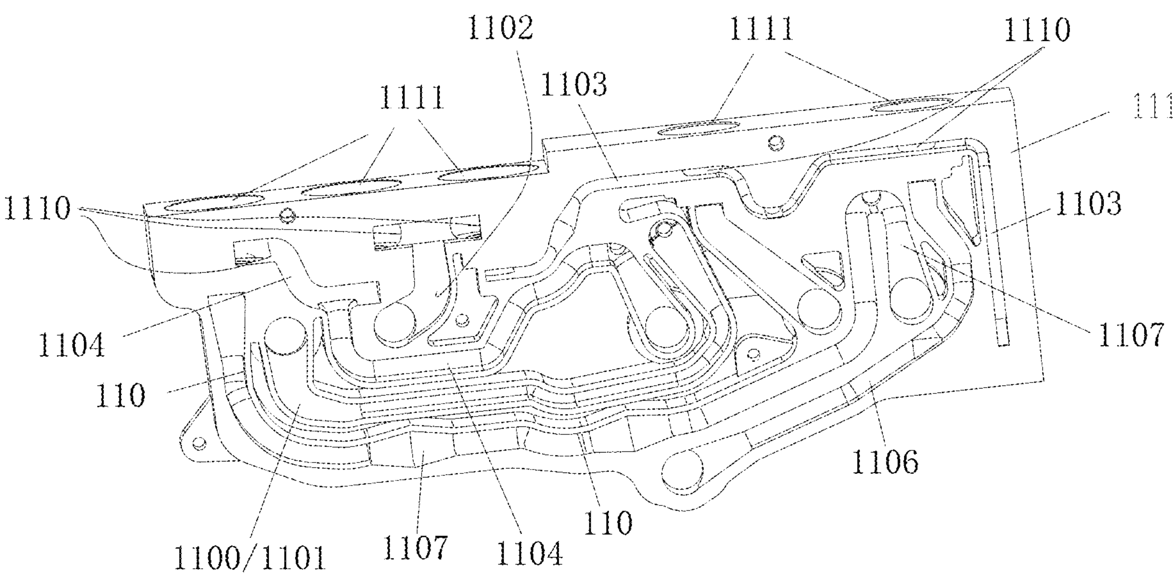
FIG. 6 is a schematic view of the three-dimensional structure of the first plate body of the connector in FIG. 1 from another perspective.
Figure 7:
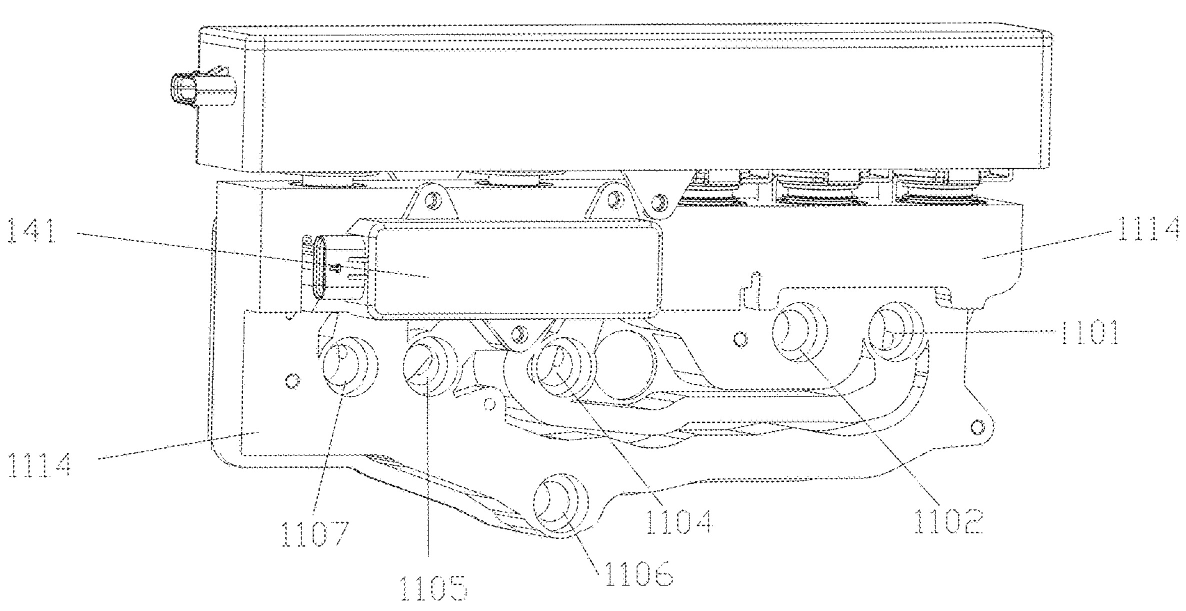
FIG. 7 is a schematic view of a three-dimensional structure of a fluid management apparatus according to a second embodiment of the present application from one perspective.
Figure 8:
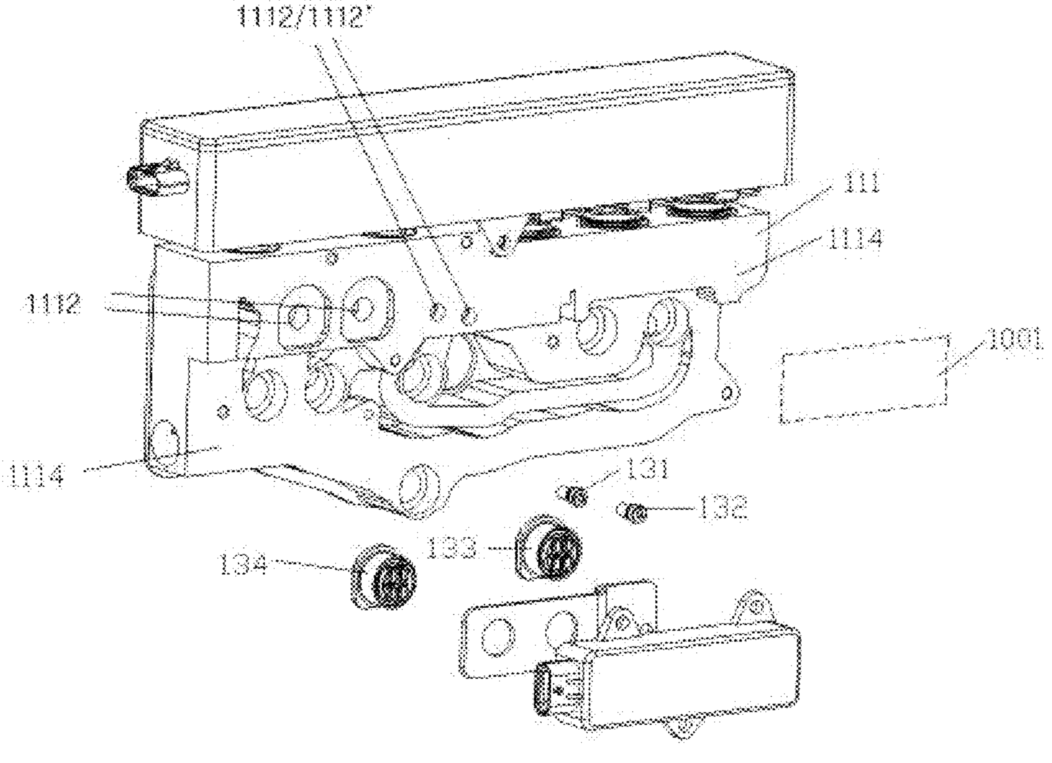
FIG. 8 is a schematic view of an exploded structure of the fluid management apparatus in FIG. 7.
Figure 9:
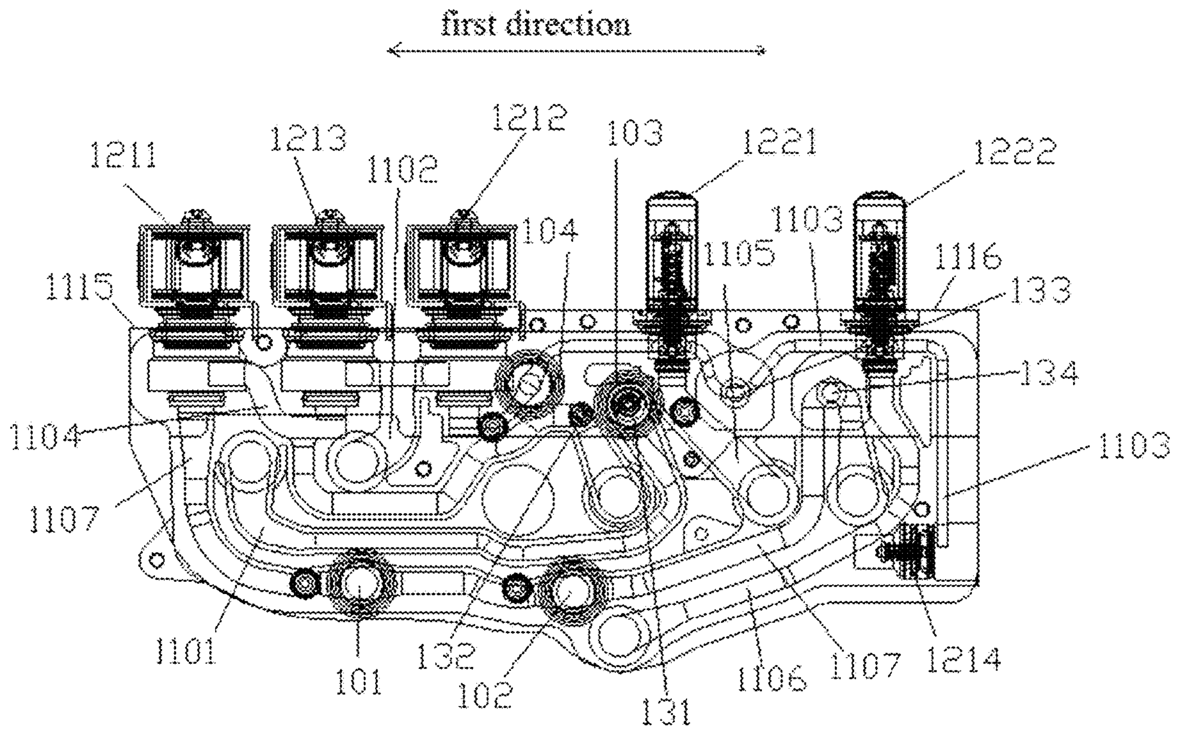
FIG. 9 is a schematic perspective view of the fluid management apparatus in FIG. 7.
Figure 10:
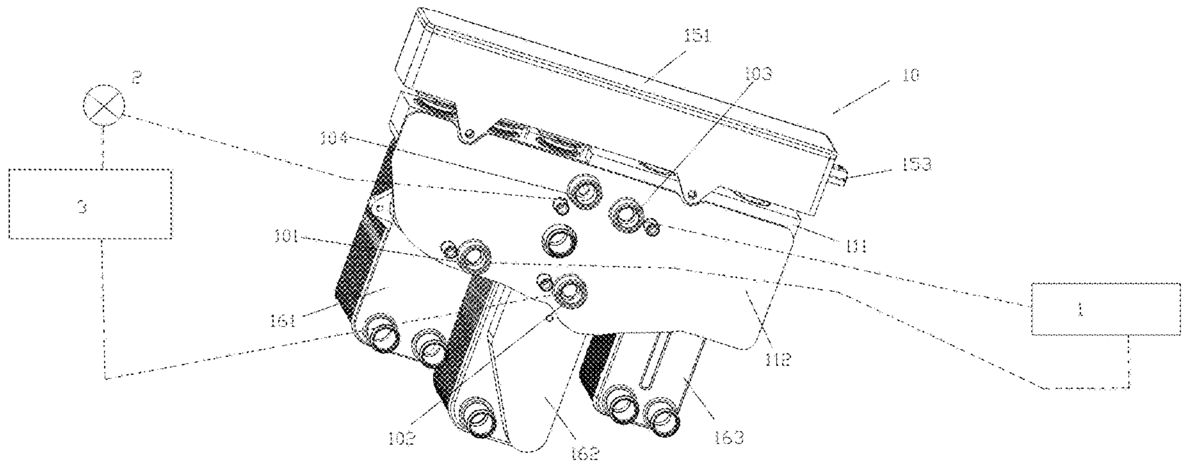
FIG. 10 is a schematic view showing connection of a thermal management system.

Please refer to FIG. 3, FIG. 5 and FIG. 9, in a specific embodiment, the fluid control portions 12 include a valve unit 121 and a throttling unit 122. The first side portion 1113 includes a first sub-portion 1115 and a second sub-portion 1116. An opening of the first accommodating cavity 1111' corresponding to the valve unit 121 is located on the first sub-portion 1115, and an opening of the first accommodating cavity 1111' corresponding to the throttling unit 122 is located on the second sub-portion 1116. The valve unit 121 and the throttling unit 122 are arranged in different areas, and the throttling unit 122 and the valve unit 121 are not placed alternately, which facilitates the miniaturization of the fluid management apparatus 10 and the installation of the fluid management apparatus 10. The valve unit 121 may be a solenoid valve, a ball valve or other types of on-off valve, and the throttling unit 122 may be an electronic expansion valve, a thermal expansion valve or other types of throttling valve. In this embodiment, the valve unit 121 is a solenoid valve and the throttling unit 122 is an electronic expansion valve. In a more specific embodiment, the valve unit 121 includes a first valve unit 1211, a second valve unit 1212, and a third valve unit 1213. A part of the first accommodating cavities 1111' of the fluid management apparatus 10 are in one-to-one correspondence with the above valve units, and each of the valve units is fixedly or limitedly connected to the connector 11. The throttling unit 122 includes a first throttling unit 1221 and a second throttling unit 1222. The other part of the first accommodating cavities 1111' of the fluid management apparatus 10 are in one-to-one correspondence with the throttling units, and each of the throttling units is fixedly or limitedly connected to the connector 11. A first direction is defined on the first plane, and the first direction is perpendicular to the axial direction of the first accommodating cavity 1111'. Along the first direction, the first throttling unit 1221 is closer to the first sub-portion 1115 than the second throttling unit 1222, the third valve unit 1213 is located between the first valve unit 1211 and the second valve unit 1212, and the second valve unit 1212 is closer to the second sub-portion 1116 than the third valve unit 1213. Of course, in other embodiments, the number of the fluid control portions 12 may be two or more, which will not be described in detail.

Figure 4:
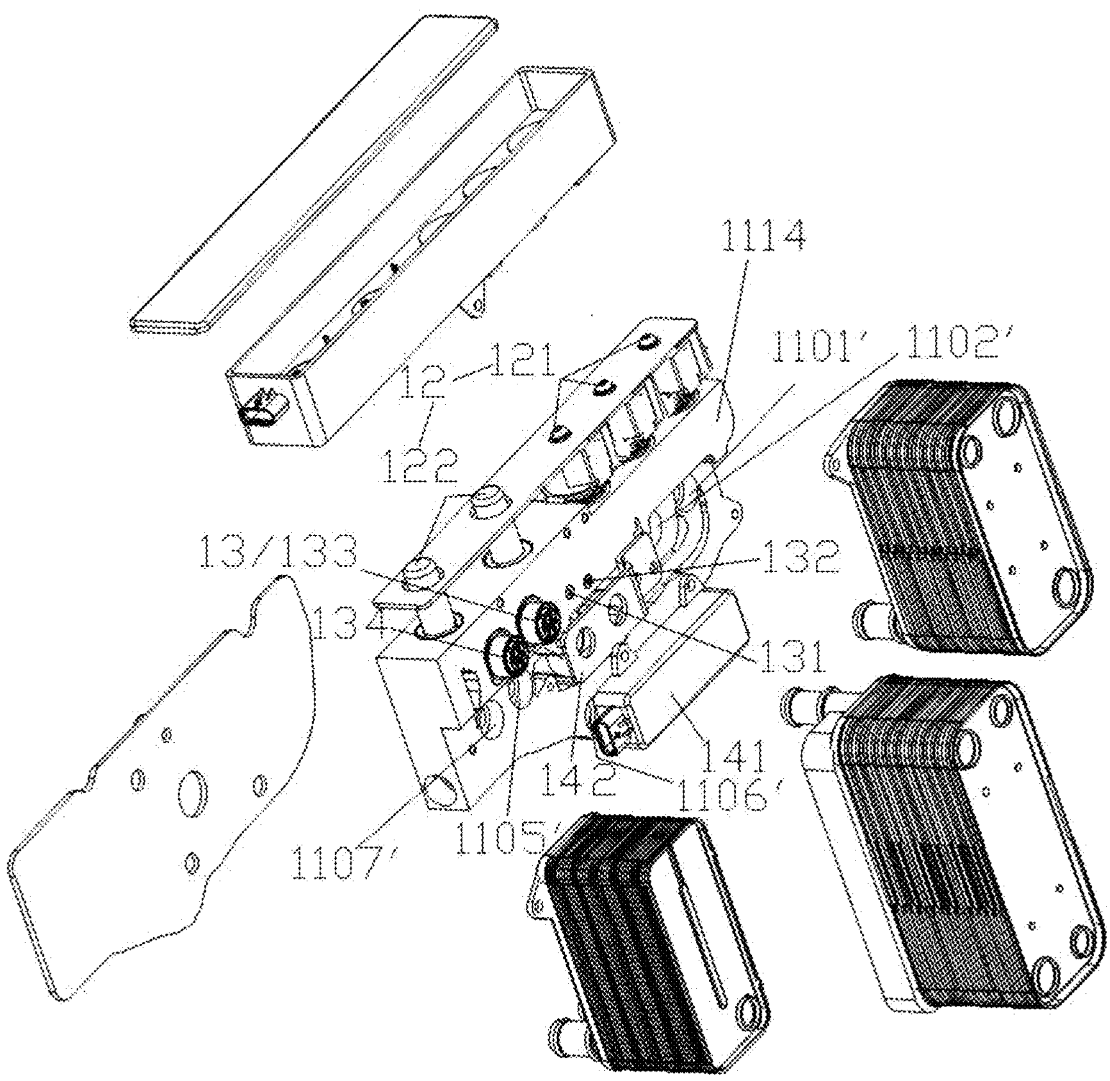
FIG. 4 is a schematic view of the exploded structure of the fluid management apparatus in FIG. 1 from another perspective.

Please refer to FIG. 4, the fluid management apparatus 10 further includes a heat exchange portion 16, and the heat exchange portion 16 is fixedly or limitedly connected to the second side portion 1114. The heat exchange portion 16 includes a flow channel, and the flow channel of the heat exchange portion 16 has an opening facing the second side portion 1114, and the communication channel 1100 is in communication with the flow channel. The heat exchange portion 16 includes a plurality of stacked plates, and the stacking direction of the plates is perpendicular to the first plane 1001. Along the axial direction of the first accommodating portion 1111, the second accommodating portion 1112 is closer to the first accommodating portion 1111 than the heat exchange portion 16. In this embodiment, the heat exchange portion 16 is a plate heat exchanger, and the heat exchange portion 16 includes the plurality of stacked plates. The flow channel of the heat exchange portion 16 includes a first flow channel and a second flow channel. When the heat exchange portion 16 is in operation, the fluid in the first flow channel and the fluid in the second flow channel can exchange heat within the heat exchange portion 16. The fluid in the first flow channel and the fluid in the second flow channel may be the same medium or different media. In this embodiment, the fluid in the first flow channel is a refrigerant, and the fluid in the second flow channel is a cooling liquid. The first flow channel includes a first hole channel, a second hole channel and an inter-plate channel, and the first hole channel is in communication with the second hole channel via the inter-plate channel. Specifically, the heat exchange portion 16 includes a first heat exchanger 161, a second heat exchanger 162 and a third heat exchanger 163. Along the first direction, the third heat exchanger 163 is located at one side of the second heat exchanger 162, and the first heat exchanger 161 is located at the other side of the second heat exchanger 162. That is, the third heat exchanger 163 and the first heat exchanger 161 are located at different sides of the second heat exchanger 162. In the axial direction of the first accommodating portion 1111, the third heat exchanger 163 is closer to the second sub-portion 1116 than the first heat exchanger 161, and the first heat exchanger 161 is closer to the second sub-portion 1116 than the third heat exchanger 163.

Please refer to FIG. 4 and FIGS. 6 to 9, the communication channel 1100 of the connector 11 includes a first sub-channel 1101, a second sub-channel 1102, a third sub-channel 1103, a fourth sub-channel 1104, a fifth sub-channel 1105, a sixth sub-channel 1106 and a seventh sub-channel 1107. The first sub-channel 1101 has an opening 1101', facing the first flow channel of the first heat exchanger 161, on the second side portion 1114. Specifically, the first sub-channel 1101 has the opening facing the first hole channel of the first heat exchanger 161 on the second side portion 1114, and the first sub-channel 1101 is in communication with the first hole channel of the first heat exchanger 161. The second sub-channel 1102 has an opening 1102', facing the first flow channel of the first heat exchanger 161, on the second side portion 1114. Specifically, the second sub-channel 1102 has the opening facing the second hole channel of the first heat exchanger 161 on the second side portion 1114, and the second sub-channel 1102 is in communication with the second hole channel of the first heat exchanger 161. In this way, the first sub-channel 1101 can be in communication with the second sub-channel 1102 via the first flow channel of the first heat exchanger 161. The second sub-channel 1102 has an opening in a wall of the accommodating portion for accommodating the third valve unit 1213, and the second sub-channel 1102 further has an opening in a wall of the accommodating portion for accommodating the second valve unit 1212. The second valve unit 1212 is configured to allow or block communication between the second sub-channel 1102 and the third sub-channel 1103, and the third valve unit 1213 is configured to allow or block communication between the second sub-channel 1102 and the fourth sub-channel 1104. The third sub-channel 1103 has an opening in a wall of the accommodating portion for accommodating the first throttling unit 1221, and the third sub-channel 1103 further has an opening in a wall of the accommodating portion for accommodating the second throttling unit 1222. The third sub-channel 1103 can be in communication with the fifth sub-channel 1105 via the first throttling unit 1221, and the third sub-channel 1103 can be in communication with the sixth sub-channel 1106 via the second throttling unit 1222. The fifth sub-channel 1105 has an opening 1105', facing a first flow channel of the third heat exchanger 163, on the second side portion 1114. Specifically, the fifth sub-channel 1105 has the opening facing a first hole channel of the third heat exchanger 163 on the second side portion 1114. The fifth sub-channel 1105 is in communication with the first flow channel of the third heat exchanger 163. The sixth sub-channel 1106 has an opening 1106', facing a first flow channel of the second heat exchanger 162, on the second side portion 1114. Specifically, the sixth sub-channel 1106 has the opening facing the first hole channel of the second heat exchanger 162 on the second side portion 1114, and the sixth sub-channel 1106 is in communication with the first flow channel of the second heat exchanger 162. In this way, the fluid flowing out of the second valve unit 1212 can enter the third heat exchanger 163 through the first throttling unit 1221, and/or, the fluid flowing out of the second valve unit 1212 can enter the second heat exchanger 162 through the second throttling unit 1222. In addition, the fluid management apparatus 10 further includes a one-way component 1214, the one-way component 1214 is located within the connector 11, and is fixedly or limitedly connected to the connector 11. The one-way component 1214 enables the sixth sub-channel 1106 to be in unidirectional communication with the third sub-channel 1103. The fourth sub-channel 1104 has an opening, facing the first flow channel of the second heat exchanger 162, on the second side portion 1114. Specifically, the fourth sub-channel 1104 has the opening facing the second hole channel of the second heat exchanger 162 on the second side portion 1114, and the fourth sub-channel 1104 is in communication with the first flow channel of the second heat exchanger 162, so that the fluid flowing out from the third valve unit 1213 can enter the second heat exchanger 162. The fourth sub-channel 1104 has an opening in a wall of the accommodating portion for accommodating the first valve unit 1211, and the first valve unit 1211 can allow or block communication between the fourth sub-channel 1104 and the seventh sub-channel 1107. The seventh sub-channel 1107 has an opening 1107', facing the first flow channel of the third heat exchanger 163, on the second side portion 1114. Specifically, the seventh sub-channel 1107 has the opening facing the first hole channel of the third heat exchanger 163 on the second side portion 1114, and the seventh sub-channel 1107 is in communication with the first flow channel of the third heat exchanger 163.

Figure 2:
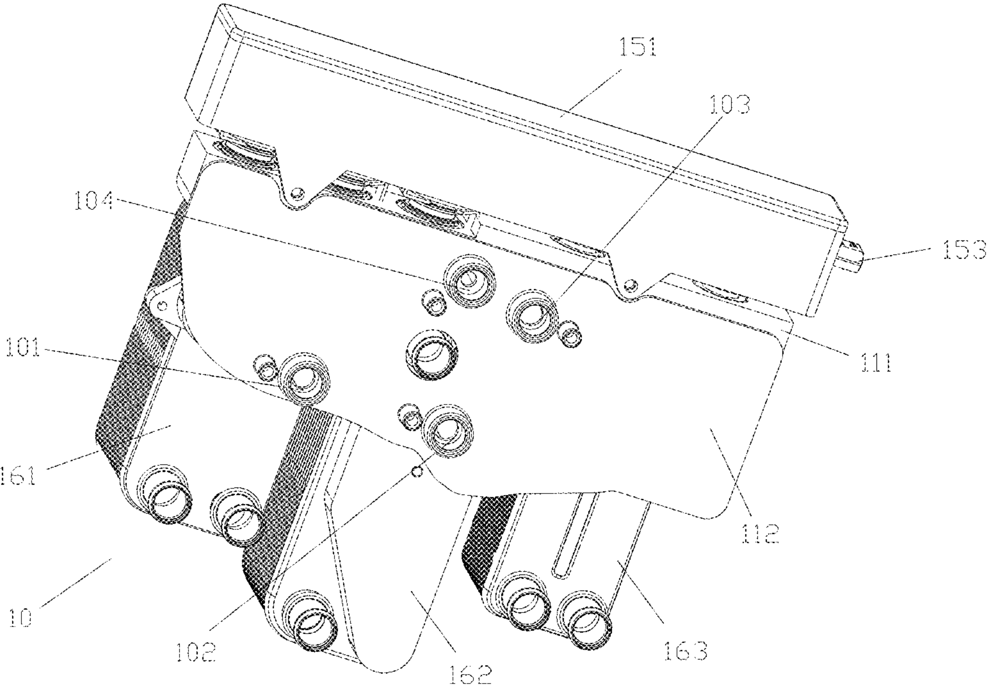
FIG. 2 is a schematic view of the three-dimensional structure of the fluid management apparatus in FIG. 1 from another perspective.

Please refer to FIG. 2, FIG. 4 and FIG. 9, the fluid management apparatus 10 has a first port 101, a second port 102, a third port 103 and a fourth port 104. The first port 101, the second port 102, the third port 103 and the fourth port 104 are located in the second plate body 112 or in a tube or a block fixedly or limitedly connected to the second plate body 112. The first port 101 and the second port 102 are in communication with the seventh sub-channel 1107, the third port 103 is in communication with the first sub-channel 1101, and the fourth port 104 is in communication with the third sub-channel 1103. The sensing portion 13 includes a first sensing portion 131, a second sensing portion 132, a third sensing portion 133 and a fourth sensing portion 134. The accommodating cavity or communication cavity for accommodating the first sensing portion 131 is in communication with the first sub-channel 1101, the accommodating cavity or communication cavity for accommodating the second sensing portion 132 is in communication with the fourth sub-channel 1104, and the accommodating cavity or communication cavity for accommodating the third sensing portion 133 is in communication with the third sub-channel 1103, and the accommodation cavity or communication cavity for accommodating the fourth sensing portion 134 is in communication with the seventh sub-channel 1107.

A first cross-section is defined, and the first cross-section is perpendicular to an extending direction of the communication channel 1100. The first cross-section intersects with the communication channel 1100 to form at least one flow cross-section. The area of the flow cross-section is constant, and the flow cross-section has a width and a depth. In the communication channel 1100, the depth of the flow cross-section is increased gradually along the flowing direction of the fluid, and the width of the flow cross-section is decreased along the flowing direction of the fluid, which facilitates the reduction of the flow resistance as well as the reduction of the volume of the fluid management apparatus 10.

Please refer to FIGS. 1 to 10, a thermal management system is further provided according to one embodiment of the present application, and the thermal management system can be applied to a vehicle. Specifically, the thermal management system includes a compressor 1, a throttling element 2, a fourth heat exchanger 3 and a fluid management apparatus 10, where the throttling element 2 is located upstream of the fourth heat exchanger 3 for throttling and depressurizing the fluid flowing through the fourth heat exchanger 3, and the fourth heat exchanger 3 may be a micro-channel heat exchanger or a plate heat exchanger. The fluid management apparatus 10 includes a first port 101, a second port 102, a third port 103 and a fourth port 104. An outlet of the compressor 1 is in communication with the third port 103, the fourth port 104 is in communication with the second port 102 through a throttling unit and a first heat exchanger 161, and the first port 101 is in communication with an inlet of the compressor. The fluid management apparatus 10 includes the first heat exchanger 161, a second heat exchanger 162 and a third heat exchanger 163. The first heat exchanger 161, the second heat exchanger 162 and the third heat exchanger 163 are all plate heat exchangers, and the above heat exchangers further have a second flow channel. The fluid management apparatus 10 further includes a first sensing portion 131, a second sensing portion 132, a third sensing portion 133 and a fourth sensing portion 134. The first sensing portion 131 is a temperature sensor for measuring a temperature at the outlet of the compressor. The second sensing portion 132 is a temperature sensor for measuring a supercooling degree of the first heat exchanger 161 or a superheating degree of the second heat exchanger 162. The third sensing portion 133 is a temperature and pressure sensor for measuring a superheating degree of the third heat exchanger 163. The fourth sensing portion 134 is a temperature and pressure sensor for measuring the supercooling degree of the first heat exchanger 161 or the superheating degree of the second heat exchanger 162.

In a heating mode of the thermal management system, the high-temperature and high-pressure refrigerant discharged from the compressor 1 enters the first heat exchanger 161 through the third port 103 and the first sub-channel 1101, and releases heat in the first heat exchanger 161, the refrigerant flowing out of the first heat exchanger 161 enters the second sub-channel 1102, and the third valve unit 1213 is closed and the second valve unit 1212 is opened, that is, the refrigerant enters the third sub-channel 1103 through the second valve unit 1212, the second throttling unit 1222 is opened, the first throttling unit 1221 and the throttling element are closed. The refrigerant enters the sixth sub-channel 1106 after being throttled and depressurized by the second throttling unit 1222, then the refrigerant absorbs heat and is evaporated in the third heat exchanger 163, and then the refrigerant flows through the fourth sub-channel 1104 and the first valve unit 1211 to enter the compressor via the first port 101. In other modes of the thermal management system, the first throttling unit 1221 and/or the throttling element may be opened instead, and the refrigerant may absorb heat and is evaporated in the third heat exchanger 163 and/or the fourth heat exchanger 3.

In a refrigeration mode of the thermal management system, the high-temperature and high-pressure refrigerant discharged from the compressor 1 enters the first heat exchanger 161 through the third port 103 and the first sub-channel 1101, the refrigerant does not exchange heat or only exchanges a small amount of heat in the first heat exchanger 161. The refrigerant flowing out of the first heat exchanger 161 enters the second sub-channel 1102, the first valve unit 1211 is closed, the second valve unit 1212 is closed and the third valve unit 1213 is opened. That is, the refrigerant enters the fourth sub-channel 1104 through the third valve unit 1213, releases heat in the second heat exchanger 162, then enters the third sub-channel 1103 through the sixth sub-channel 1106 and the one-way component 1214, and finally flows out of the fluid management apparatus 10 through the fourth port 104. At this time, the first throttling unit 1221 and the second throttling unit 1222 are closed, the throttling element 2 is opened, and the refrigerant absorbs heat and is evaporated in the fourth heat exchanger 3. The refrigerant flowing out of the fourth heat exchanger 3 enters the seventh sub-channel 1107 through the second port 102, and then enters the compressor through the first port 101. In other modes of the thermal management system, the first throttling unit 1221 may be opened instead, in this case, the refrigerant may absorb heat and be evaporated in the third heat exchanger 163.

It should be noted that the above embodiments are only used to illustrate the present application, rather than limiting the technical solutions described in the present application. Although the present application has been described herein in detail with reference to the above embodiments in this specification, it should be understood by those of ordinary skill in the art that modification or equivalent substitution may still be made to the present application by those skilled in the art, and all technical solutions and improvements thereof that do not depart from the scope of the present application should be included in the scope of the claims of the present application.

The invention claimed is:

1. A fluid management apparatus, comprising a connector, one or more fluid control portions, and one or more sensing portions, wherein the connector comprises a first accommodating portion having a first accommodating cavity and a second accommodating portion having a second accommodating cavity, at least part of each fluid control portion is located in the first accommodating cavity, and the one or more fluid control portions are fixedly or limitedly connected to the connector, at least part of each sensing portion is located in the second accommodating cavity, and the one or more sensing portions are fixedly or limitedly connected to the connector;

the connector is provided with a communication channel, and the communication channel has an opening in a wall of the first accommodating portion, and a sensing element of each sensing portion is located in the communication channel; and the connector further comprises a first side portion and a second side portion, the first accommodating cavity has an opening on the first side portion and the second accommodating cavity has an opening on the second side portion; a first plane is defined, and a wall of the first side portion is perpendicular to the first plane and the first plane is perpendicular to an axis of the second accommodating portion; the communication channel comprises a plurality of sub-channels, and projections of the sub-channels on the first plane are not overlapped.

2. The fluid management apparatus according to claim 1, wherein the number of the sensing portions is two or more, the number of the second accommodating cavities is plural, which are in one-to-one correspondence with the sensing portions;

the fluid management apparatus comprises a first housing, a first circuit board and a first plug, wherein the first housing is fixedly or limitedly connected to the connector, and at least part of the first circuit board is located in the first housing; the first circuit board has a surface facing the second side portion, and each of the sensing portions is electrically and/or signally connected to the first circuit board; a shell of the first plug is fixedly or limitedly connected to the first housing or is of a one-piece structure with the first housing, and a pin of the first plug is electrically and/or signally connected to the first circuit board.

3. The fluid management apparatus according to claim 2, wherein the number of the fluid control portions is two or more, the number of the first accommodating cavities is plural, which are in one-to-one correspondence with the fluid control portions;

the fluid management apparatus comprises a second housing, a second circuit board and a second plug, wherein the second housing is fixedly or limitedly connected to the connector, and at least part of the second circuit board is located in the second housing; the second circuit board has a surface facing the first side portion, each of the fluid control portions is electrically and/or signally connected to the second circuit board; a shell of the second plug is fixedly or limitedly connected to the second housing or is of a one-piece structure with the second housing, and a pin of the second plug is electrically and/or signally connected to the second circuit board.

4. The fluid management apparatus according to claim 3, wherein the first side portion comprises a first sub-portion and a second sub-portion, the fluid control portions together comprise valve units and throttling units, openings of a part of the first accommodating cavities corresponding to the valve units are located at the first sub-portion, and openings of another part of the first accommodating cavities corresponding to the throttling units are located at the second sub-portion; and the valve units comprise a first valve unit, a second valve unit and a third valve unit, and the throttling units comprise a first throttling unit and a second throttling unit; a first direction is defined on the first plane, and the first direction is perpendicular to an axial direction of the first accommodating cavity; along the first direction, the first throttling unit is closer to the first sub-portion than the second throttling unit, the third valve unit is located between the first valve unit and second valve unit, and the second valve unit is closer to the second sub-portion than the third valve unit.

5. The fluid management apparatus according to claim 4, wherein the fluid management apparatus comprises a heat exchange portion, and the heat exchange portion is fixedly or limitedly connected to the second side portion; wherein the heat exchange portion comprises a flow channel, the flow channel has an opening facing the second side portion, and the communication channel is in communication with the flow channel; the heat exchange portion comprises a plurality of stacked plates, and a stacking direction of the plates is perpendicular to the first plane; and along an axial direction of the first accommodating portion, the second accommodating portion is closer to the first accommodating portion than the heat exchange portion.

6. The fluid management apparatus according to claim 5, wherein the heat exchange portion comprises a first heat exchanger, a second heat exchanger and a third heat exchanger; and along the first direction, the third heat exchanger is located on one side of the second heat exchanger, the first heat exchanger is located on the other side of the second heat exchanger, and the third heat exchanger and the first heat exchanger are located on different sides of the second heat exchanger; along the axial direction of the first accommodating portion, the third heat exchanger is closer to the second sub-portion than the first heat exchanger, and the first heat exchanger is closer to the first sub-portion than the third heat exchanger.

7. The fluid management apparatus according to claim 6, wherein the communication channel comprises a first sub-channel, a second sub-channel, a third sub-channel, a fourth sub-channel, a fifth sub-channel, a sixth sub-channel and a seventh sub-channel, wherein the first sub-channel has an opening facing a first flow channel of the first heat exchanger on the second side portion, the second sub-channel has an opening facing the first flow channel of the first heat exchanger on the second side portion; the second sub-channel has an opening in a wall of the accommodating portion for accommodating the third valve unit, the second sub-channel has an opening in a wall of the accommodating portion for accommodating the second valve unit; the second valve unit is configured to allow or block communication between the second sub-channel and the third sub-channel, and the third valve unit is configured to allow or block communication between the second sub-channel communicate and the fourth sub-channel;

the third sub-channel has an opening in a wall of the accommodating portion for accommodating the first throttling unit, the third sub-channel has an opening in a wall of the accommodating portion for accommodating the second throttling unit; the third sub-channel is allowed to be in communication with the fifth sub-channel through the first throttling unit, the third sub-channel is allowed to be in communication with the sixth sub-channel through the second throttling unit; the fifth sub-channel has an opening facing a first flow channel of the third heat exchanger on the second side portion, the sixth sub-channel has an opening facing a first flow channel of the second heat exchanger on the second side portion; the fluid management apparatus further comprises a one-way component, and the one-way component is configured to make the sixth sub-channel in unidirectional communication with the third sub-channel; and the fourth sub-channel has an opening facing the first flow channel of the second heat exchanger on the second side portion, the fourth sub-channel has an opening in a wall of the accommodating portion for accommodating the first valve unit, the first valve unit is configured to allow or block communication between the fourth sub-channel communicate and the seventh sub-channel, and the seventh sub-channel has an opening facing the first flow channel of the third heat exchanger on the second side portion.

8. The fluid management apparatus according to claim 7, wherein the connector comprises a first plate body and a second plate body, the first plate body and the second plate body are adjacent and fixed and hermetically connected to each other; at least one communication channel portion is provided inside at least one of the first plate body and the second plate body, and the communication channel is formed at the communication channel portion of the first plate body and the second plate body;

the first side portion and the second side portion are located in the first plate body; the fluid management apparatus is provided with a first port, a second port, a third port and a fourth port, wherein the first port, the second port, the third port and the fourth port are located in the second plate body or in a pipe or block fixedly or limitedly connected to the second plate body; the first port and the second port are in communication with the seventh sub-channel, the third port is in communication with the first sub-channel, and the fourth port is in communication with the third sub-channel.

9. The fluid management apparatus according to claim 8, wherein the sensing portions comprise a first sensing portion, a second sensing portion, a third sensing portion and a fourth sensing portion, and the accommodating cavity or a communication cavity for accommodating the first sensing portion is in communication with the first sub-channel, the accommodating cavity or a communication cavity for accommodating the second sensing portion is in communication with the fourth sub-channel, and the accommodating cavity or a communication cavity for accommodating the third sensing portion is in communication with the third sub-channel, and the accommodating cavity or a communication cavity for accommodating the fourth sensing portion is in communication with the seventh sub-channel.

10. The fluid management apparatus according to claim 9, wherein a first cross-section is defined, the first cross-section is perpendicular to an extending direction of the communication channel and intersects with the communication channel to form at least one flow cross-section, an area of the flow cross-section is constant; the flow cross-section has a width and a depth, wherein the depth of the flow cross-section is gradually increased in the communication channel along a flowing direction of a fluid, and the width of the flow cross-section is decreased in the communication channel along the flowing direction of the fluid.

11. The fluid management apparatus according to claim 6, wherein the connector comprises a first plate body and a second plate body arranged in a stacked manner, the first plate body and the second plate body are adjacent and fixed and hermetically connected to each other; at least one communication channel portion is provided inside at least one of the first plate body and the second plate body, and the communication channel is formed at the communication channel portion of the first plate body and the second plate body; and the first side portion and the second side portion are located in the first plate body; the fluid management apparatus is provided with a first port, a second port, a third port and a fourth port, wherein the first port, the second port, the third port and the fourth port are located in the second plate body or in a pipe or block fixedly or limitedly connected to the second plate body; the first port and the second port are in communication with the seventh sub-channel, the third port is in communication with the first sub-channel, and the fourth port is in communication with the third sub-channel.

12. A thermal management system, comprising a compressor, a throttling element, a heat exchanger, and the fluid management apparatus according to claim 1, wherein the fluid management apparatus comprises a first port, a second port, a third port and a fourth port; an outlet of the compressor is in communication with the third port, and the fourth port is in communication with the second port through the throttling unit and the heat exchanger, and the first port is in communication with an inlet of the compressor.

13. A thermal management system, comprising a compressor, a throttling element, a heat exchanger, and the fluid management apparatus according to claim 2, wherein the fluid management apparatus comprises a first port, a second port, a third port and a fourth port; an outlet of the compressor is in communication with the third port, and the fourth port is in communication with the second port through the throttling unit and the heat exchanger, and the first port is in communication with an inlet of the compressor.

14. A thermal management system, comprising a compressor, a throttling element, a heat exchanger and the fluid management apparatus according to claim 3, wherein the fluid management apparatus comprises a first port, a second port, a third port and a fourth port; an outlet of the compressor is in communication with the third port, and the fourth port is in communication with the second port through the throttling unit and the heat exchanger, and the first port is in communication with an inlet of the compressor.

15. A thermal management system, comprising a compressor, a throttling element, a heat exchanger, and the fluid management apparatus according to claim 4, wherein the fluid management apparatus comprises a first port, a second port, a third port and a fourth port; an outlet of the compressor is in communication with the third port, and the fourth port is in communication with the second port through the throttling unit and the heat exchanger, and the first port is in communication with an inlet of the compressor.

16. A thermal management system, comprising a compressor, a throttling element, a heat exchanger, and the fluid management apparatus according to claim 5, wherein the fluid management apparatus comprises a first port, a second port, a third port and a fourth port; an outlet of the compressor is in communication with the third port, and the fourth port is in communication with the second port through the throttling unit and the heat exchanger, and the first port is in communication with an inlet of the compressor.

* * * * *